3 Sheets—Sheet 1.

E. BALL.

Mower.

No. 1,012.

Reissued July 17, 1860.

Witnesses

A. Widdecombe

W. Yuke Atkee

Inventor:

Ephraim Ball

By his Attorney

Thos. H. Dodge

N. PETERS, Photo-Lithographer, Washington, D. C.

3 Sheets—Sheet 2.
E. BALL.
Mower.
No. 1,012.
Reissued July 17, 1860.
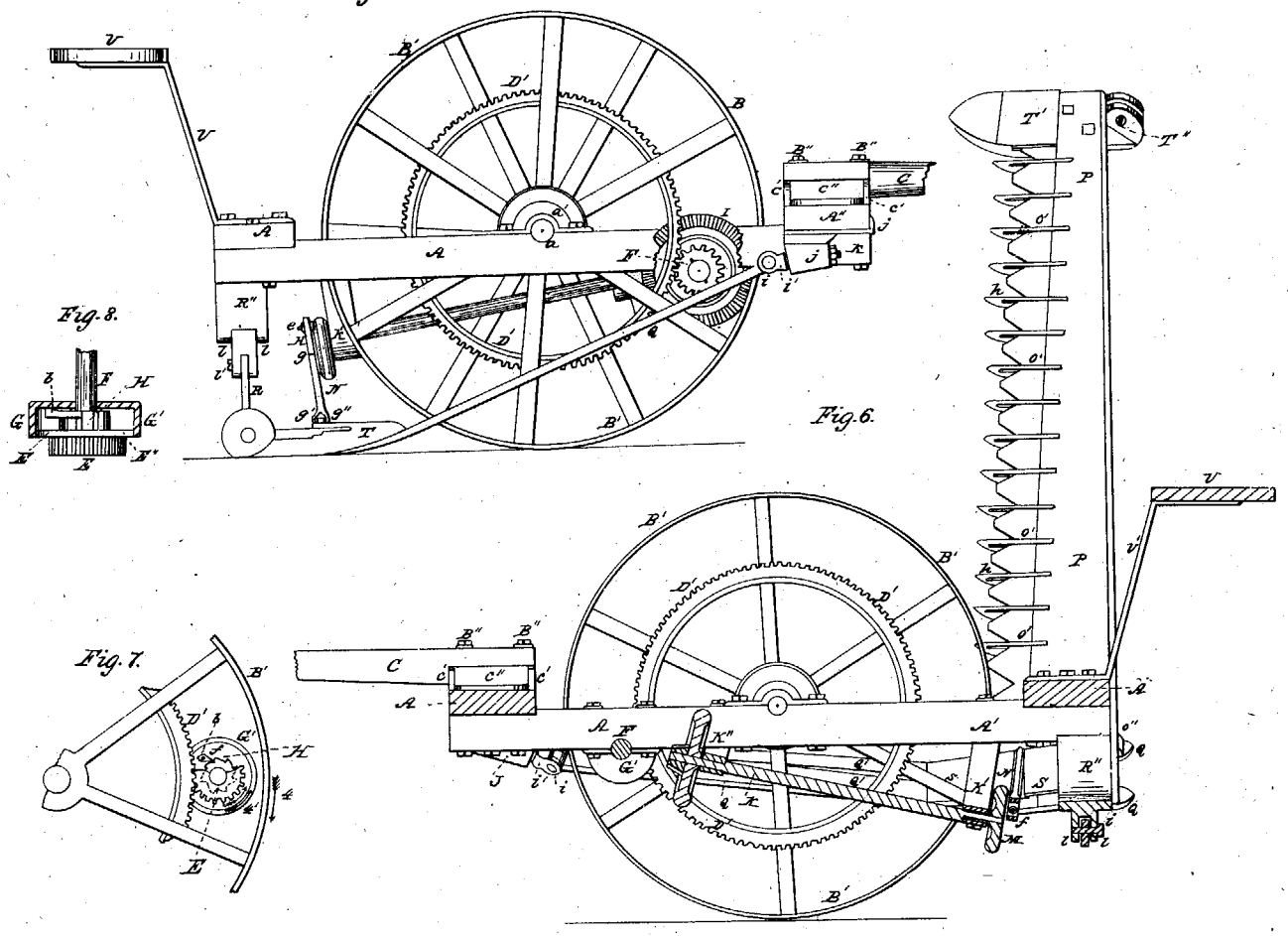
Witnesses:
A. Widdiams
Wm. Luke Ashe
Inventor:
Ephraim Ball
By his Attorney
Thos. H. Dodge
N. PETERS. Photo-Lithographer, Washington, D. C.

3 Sheets—Sheet 3.

E. BALL.

Mower.

No. 1,012.

Reissued July 17, 1860.

*Witnesses:*

A. C. Wisson

H. Yoke Ar Lee

*Inventor:*

Ephraim Ball

By his Attorney

Thos. H. Dodge

N. PETERS, Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No. 832, dated September 27, 1859; Reissue No. 1,012, dated July 17, 1860.

DIVISION NO. 3.

*To all whom it may concern:*

Be it known that I, EPHRAIM BALL, of Canton, in the county of Stark and State of Ohio, have invented certain new and useful Improvements in Mowing-Machines, of which the following is a full, clear, and exact description, reference being had to the accompanying drawings, which make a part of this specification, and in which—

Figure 1:
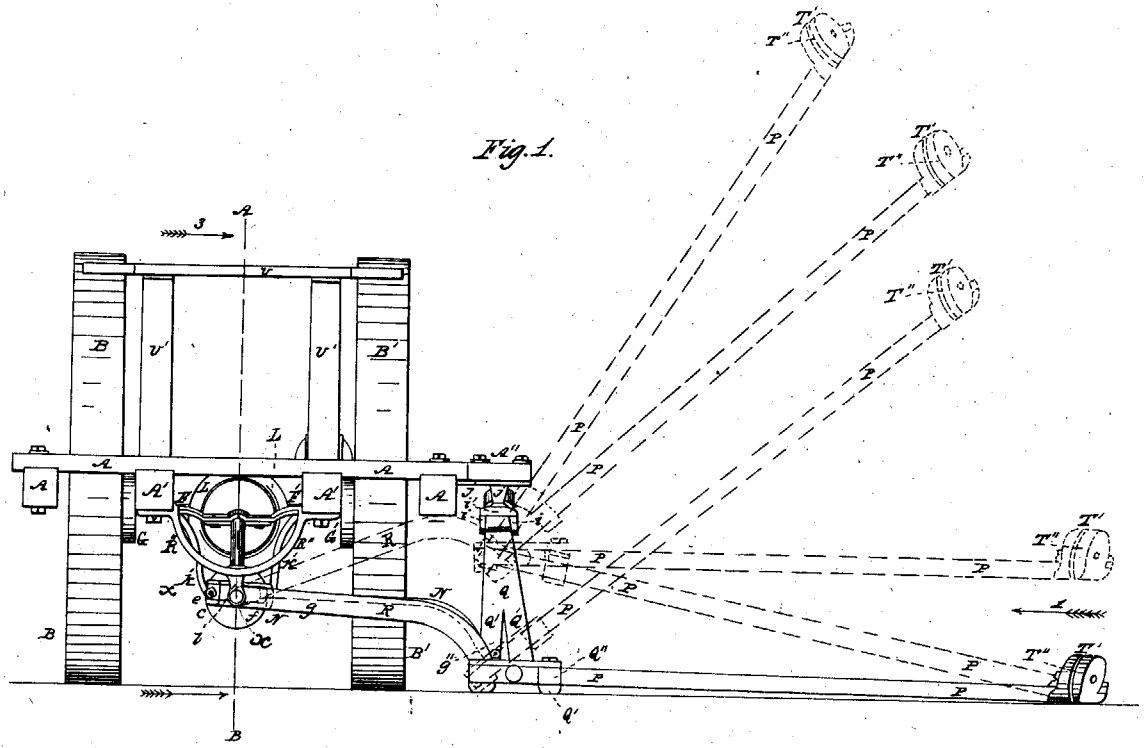
Figure 10:
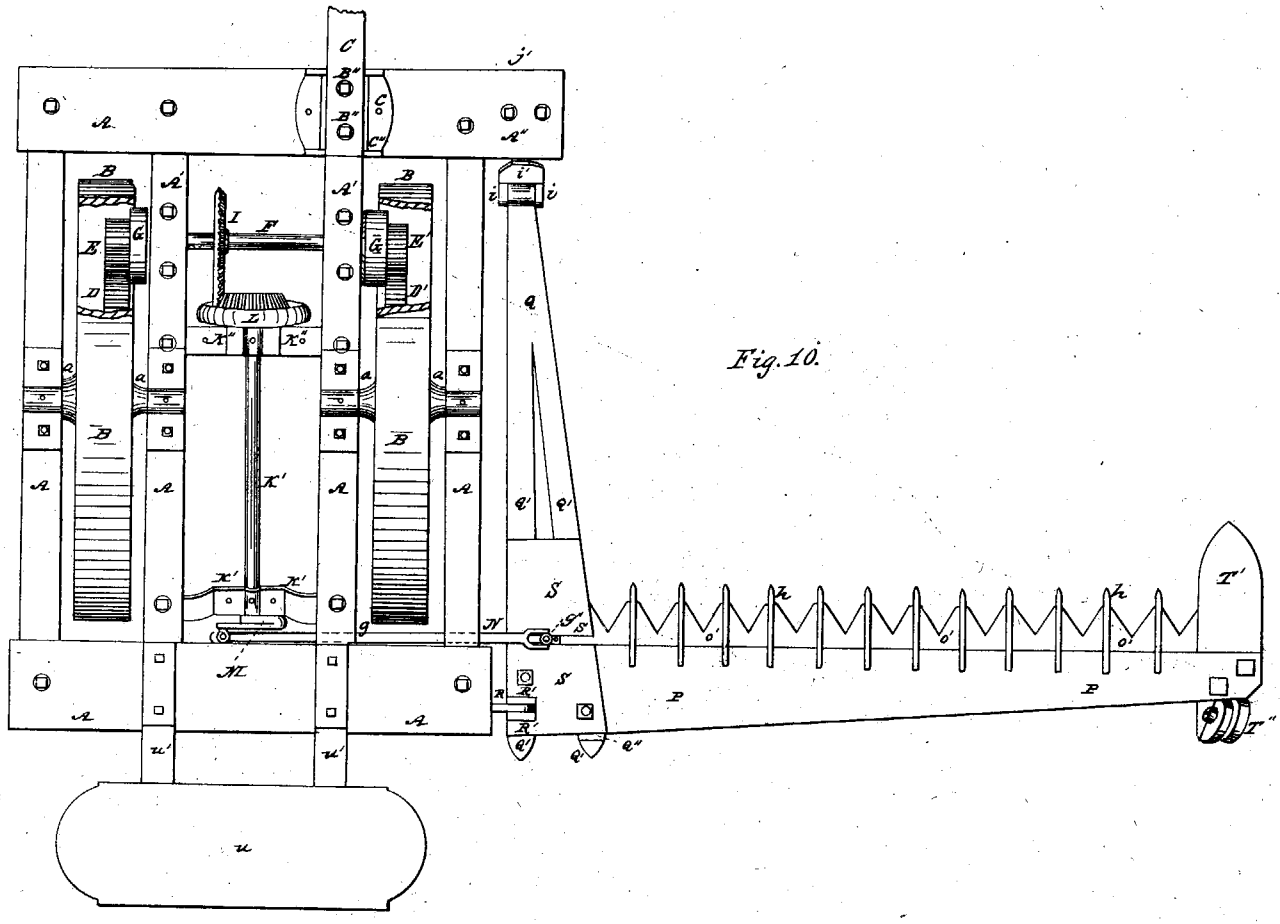

Figure 1 represents a rear view of the machine, the black lines showing the finger-beam resting upon the ground in the position it will occupy when the machine is mowing on a level surface, the blue lines showing one position of the finger-beam when mowing on an uneven surface, with its left end raised to conform thereto, the red lines showing the position of the finger-beam when mowing on an uneven surface, which raises the entire finger-beam, the dotted black lines showing the position of the finger-beam raised up at its right or outer end toward the machine to pass over an obstacle; and the dotted red lines showing the finger-beam in two different positions raised off of the ground and turned up toward the machine to pass over obstacles or through gates. Fig. 2 represents a side view of the machine looking in the direction of arrow 1, Fig. 1, when the machine is mowing on level ground, a part of the main frame being represented as broken away to show the position of the gearing. Fig. 3 represents a section on line A B, Fig. 1, looking in the direction of arrow 3, the finger-beam being shown in the highest position represented in red dotted lines, Fig. 1. Fig. 4 represents a detached view of a portion of one of the main wheels and a portion of its gearing, a part of the pinion which gears into one of the main gear-wheels being represented as broken away, together with its shield, to show one of the ratchet-wheels with its pawl, spring, and case, and by which motion is communicated from the main wheel to the main gear-shaft. Fig. 5 represents a detached plan or top view of one of the pinions on the main gear-shaft, together with its ratchet-wheel and pawl, the top of the case which covers the ratchet-wheel being represented as broken away to show the relative position of the parts. Fig. 6 represents a top or plan view of my machine, a portion of the peripheries of the wheels B B′ being broken away to show the gear-wheels.

Whenever it may be expedient to use one or more of the several parts or branches of my improvements separate from the rest, such part or parts may be used in connection with proper frames and gearing, although different from those herein described, which are proportioned and arranged with reference to the use of the whole of the parts together; and it is obvious that several parts of my improvements are applicable to various other mowing-machines in use.

One mode of applying each of my improvements to practical use being shown in this machines, it is unnecessary to specify the manner of applying the parts, respectively, to other mowing-machines, since the ordinary skill of the constructer will be sufficient for that purpose.

That branch of my improvements which is the subject of this patent consists in connecting the beam that carries the cutting apparatus with the main frame by means of a single intermediate yielding arm, brace-bar, or shoe in such manner that either end of the beam may rise and fall freely without elevating or depressing the other end, and that while being drawn over undulating ground the upward and downward movements of the beam or of either end independently of the other shall be independent of such movements of the frame and governed by the undulations of the ground.

It also consists in the combination of a short finger-beam with a single yielding brace-bar or hinged draft-shoe, whereby the tendency of the finger-beam to catch and drag along the grass cut by the previous swath or of striking against the under side of the main frame as the finger-beam rises and falls bodily or at either end to conform to the inequalities of the ground is obviated, as will be hereinafter described.

In the accompanying drawings, A A A′ A′ represent the main frame of the machine.

As the machine is drawn over the ground by the rigid draft pole or tongue C the driving-wheels B B′ move in the direction indicated by arrow 4, and, as the spur-wheels D D′ move in the same direction, the pinion-wheels E E′ are caused to move in the direction of arrow 4′, (see Fig. 7,) thus giving motion to shaft F by means of the ratchet-wheels H H, pawls *b b*, and cases G G′, and as the shaft F turns motion is communicated to the crank-shaft K through gear-wheels I and J, whereby a rapid reciprocating motion is imparted to the cutter-bar O and its cutters O′, which work through fingers or guards *h*, attached to the finger-beam P, in consequence of one end of the pitman or connecting rod being attached to the pin *e* and the other end to the projection *g′* on the heel of the cutter-bar.

The cutters and guard-fingers may be made in any of the well-known forms.

The inner end or heel of the finger-beam P is rigidly secured to the lower double runner or forked ends, Q′ Q′, of a strong metallic draft-shoe or yielding brace-bar, Q, the forward end of which extends upward and forward, and is hinged between lugs *i i* of a wrist or swivel, *i′*, which is free to turn on an axis parallel to the line of motion of the machine in a piece, *j*, attached to piece *j′* by a screw-pivot, the piece *j′* being bolted firmly to the under side of the inner projecting part, A″, of the main frame, while the wrist or swivel piece *i′* is held in place by nut *k′*.

The position of the yielding brace-bar or hinged shoe Q is parallel, or nearly so, to the line of motion of the machine, while the position of the finger-beam is at right angles, or nearly so, to the line of motion of the machine; and as the shoe or yielding brace-bar Q is the device by which the finger-beam and cutting apparatus are drawn forward as the machine advances, it is made of metal and very strong, so that it will not buckle or twist under the great longitudinal and lateral strain which it has to bear in drawing forward and sustaining the finger-beam in its proper and relative position thereto.

To sustain the shoe or brace-bar Q in its lateral relative position as respects the main frame, a coupling-arm, R, is hinged at its right end between the lugs R′ R′, which project up from the left side or fork of the shoe or yielding brace-bar Q, and at the heel of the finger-beam P, while its left end is hinged on a line with the longitudinal center of the crank-shaft K between lugs *l l*, projecting down from a hanger, R″, which is firmly bolted to the rear under sides of the pieces A′ A′ of the main frame.

The tongue C is fitted into a metallic tongue-piece, C′, having shoulders C″, and then bolts B″ are passed down through both the tongue-piece and front piece of the main frame. U is the driver's seat, supported by springs U′, attached to the rear of the main frame.

While the machine is in operation the finger-beam P, which supports the cutters, can freely rise and fall bodily, or either end can freely rise and fall independently of the other end and of the main frame, since the hinged connection of the yielding brace-bar or shoe Q, with the wrist *i′*, allows of a free up-and-down movement of the entire finger-beam, and, as the wrist or swivel piece *i′* is free to turn in the piece *j*, the yielding brace-bar or hinged draft-shoe Q and finger-beam P have also a free rolling or lateral motion at right angles, or nearly so, to the line of motion of the machine.

It will thus be seen that my machine is well adapted for use not only on even or level surfaces, but on rough and uneven ground, since if an elevation occurs between the outer end of the finger-beam and the inner driving-wheel the finger-beam conforms freely to such inequalities in the ground, (one such position being shown in blue lines, Fig. 1,) or the outer end can rise to conform to inequalities, while the other end is free to rest on the ground.

As the finger-beam P is only of sufficient length to protect the cutters, its motions are not impeded at all by any elevations or obstructions in the path of the main frame; nor is the heel of the finger-beam liable to catch and drag along cut stalks of grass, as would be the case if the finger-beam extended by the rear end of the main frame, or even by the rear of the inner driving-wheel, B′, since in either case every time the outer end of the finger-beam happened to be elevated the other end, or that portion of it which extended beyond the cutters, would be forced down into the grass cut by the previous swath, and catch and drag it along, thus interfering with the proper operation of the machine. Another disadvantage attending the use of long finger-beams is that the end which extends beyond the cutters, coming in contact with the ground, prevents the heel of the cutters from running as close to the ground as it otherwise would when the outer end of the finger-beam rises to conform to inequalities in the ground, and thus prevents the grass from being cut as close to the ground under such circumstances as it can be by the use of my improvement. It sometimes happens, too, that two elevations occur in the ground, by which the finger-beam is raised, as shown in red lines, Fig. 1, one elevation being near the heel and the other near the outer end of the finger-beam. In such cases, if the finger-beam extended by the rear of the main frame, it would be liable to strike against the hangers of the crank-shaft and coupling-arm, and thus raise the main frame and driving-wheel entirely off of the ground, whereby the cutters would cease to work and become clogged. There would also be great liability of breaking or bending of some portion of the machine. These difficulties, however, are all obviated by my improvements. As the end of the coupling-arm which is hinged to the shoe or yielding brace-bar Q rises above or falls below a horizontal plane passing through its hinge or joint with the main frame, the shoe or yielding brace-bar is drawn toward the machine, and therefore to avoid any cramping in the joints of the coupling-arm and shoe or brace-bar Q, the front connection of the shoe or yielding bar Q must be such as to permit the rear thereof to have a free lateral motion, sufficient to enable it to conform to the circular motion of the right hinge of the coupling-arm as the finger-beam rises and falls to conform to the inequalities of the ground. One way in which this can be done is shown in my machine, and consists in attaching the piece *j* to the piece *j'* by a pivot or screw so that the yielding brace-bar or shoe Q can move freely laterally on said screw or pivot as a center.

What I claim under this patent as my invention is—

1. The combination of the finger-beam and the main frame with a single yielding brace-bar or shoe, whereby the progressive movement of the finger-beam over the ground will be controlled by the main frame, and the free upward and downward movements of the entire finger-beam, or of either end independently of the other, and of the up-and-down movements of the main frame by the undulations of the ground over which it is drawn, substantially as set forth.

2. The combination of a yielding brace-bar or shoe, Q, and a yielding coupling-arm, R, with the main frame, substantially as set forth.

3. The combination of the short finger-beam, with the yielding connection, with the main frame, substantially as set forth.

In testimony whereof I have hereunto signed my name.

EPHRAIM BALL.

Witnesses:
DANIEL GOTSHALL,
D. H. HARMON.